United States Patent
de Goycoechea

(10) Patent No.: US 11,412,578 B2
(45) Date of Patent: Aug. 9, 2022

(54) INTELLIGENT DISTRIBUTED ANTENNA SYSTEM MONITORING

(71) Applicant: Ricardo Matias de Goycoechea, Cordoba (AR)

(72) Inventor: Ricardo Matias de Goycoechea, Cordoba (AR)

(73) Assignee: Fiplex Communications, Inc., Miami, FL (US)

( * ) Notice: Subject to any disclaimer, the term of this patent is extended or adjusted under 35 U.S.C. 154(b) by 54 days.

(21) Appl. No.: 16/871,002

(22) Filed: May 10, 2020

(65) Prior Publication Data

US 2020/0359460 A1 Nov. 12, 2020

Related U.S. Application Data

(60) Provisional application No. 62/845,914, filed on May 10, 2019.

(51) Int. Cl.
| | |
|---|---|
| *H04W 88/08* | (2009.01) |
| *H04W 24/02* | (2009.01) |
| *H04B 7/024* | (2017.01) |
| *H04B 10/2575* | (2013.01) |

(52) U.S. Cl.
CPC .......... *H04W 88/085* (2013.01); *H04B 7/024* (2013.01); *H04B 10/25753* (2013.01); *H04W 24/02* (2013.01)

(58) Field of Classification Search
CPC . H04M 3/4935; H04W 88/085; H04W 24/02; H04B 7/024; H04B 10/25753
See application file for complete search history.

(56) References Cited

U.S. PATENT DOCUMENTS

| | | | | |
|---|---|---|---|---|
| 2013/0023285 | A1* | 1/2013 | Markhovsky | G01S 5/14 455/456.1 |
| 2014/0269859 | A1* | 9/2014 | Hanson | H04W 88/085 375/219 |
| 2015/0119079 | A1* | 4/2015 | Tarlazzi | H04W 24/00 455/456.1 |
| 2016/0366554 | A1* | 12/2016 | Markhovsky | H04L 5/005 |
| 2018/0159592 | A1* | 6/2018 | Rappaport | H04B 3/46 |
| 2018/0220301 | A1* | 8/2018 | Gallagher | H04W 4/021 |
| 2018/0279132 | A1* | 9/2018 | Kruh | H04W 16/24 |
| 2018/0351641 | A1* | 12/2018 | Hoffmann | H04W 24/08 |

(Continued)

*Primary Examiner* — Benjamin H Elliott, IV
(74) *Attorney, Agent, or Firm* — Rafael Perez-Pineiro, Esq.; The Brickell IP Group, PLLC

(57) ABSTRACT

The disclosed system may include a signal source for transmitting downlink signals and receiving uplink signals to and from an indoor signal coverage area; a distributed antenna system interposed between the signal source and the indoor signal coverage area, the distributed antenna system having a master unit connected to at least one remote unit through a distribution network; and at least one antenna, connected to and corresponding to the at least one remote unit, for transmitting and receiving the downlink signals and the uplink signals to and from terminal units within the indoor coverage area. The master unit and the remote unit may be configured to detect the location of points of anomaly within the communication system. The master unit may be configured to detect the location of terminal units within the indoor coverage area based on information provided by the at least one remote unit.

19 Claims, 13 Drawing Sheets

(56) References Cited

U.S. PATENT DOCUMENTS

| | | | |
|---|---|---|---|
| 2019/0191318 A1* | 6/2019 | Jovanovic | H04W 56/001 |
| 2020/0144973 A1* | 5/2020 | Gunzner | H02H 9/00 |
| 2020/0213880 A1* | 7/2020 | de Goycoechea | H04B 17/16 |
| 2020/0287634 A1* | 9/2020 | Adamo | H04B 17/19 |
| 2020/0359460 A1* | 11/2020 | de Goycoechea | H04W 24/02 |
| 2021/0144537 A1* | 5/2021 | Ben Tolila | H04W 24/10 |

* cited by examiner

INTELLIGENT DISTRIBUTED ANTENNA SYSTEM MONITORING

CROSS REFERENCE TO RELATED APPLICATIONS

This application claims the benefit of U.S. Provisional Application No. 62/845,914 filed May 10, 2019, the disclosure of which is hereby incorporated herein by reference in its entirety.

FIELD OF THE INVENTION

Embodiments of the present invention generally relate to a system and method for monitoring the operational condition of a radio distribution network of a Distributed Antenna System ("DAS").

BACKGROUND

When transmission or retransmission of radio frequency (RF) signals is desired, such as signals from cellular networks, WiFi, LTE systems, public safety systems, and others, inside or within a specific area or location such as building, an underground subway station, a basement, a parking lot, a stadium, and others, a signal source is used to transmit the RF signals. These signal sources include, for example, a Base Transceiver Station (BTS), a Small Cell, a Signal Booster (or BDA or Repeater), a Fiber DAS (distributed antenna system), and/or an equivalent signal source. The output port or ports of the signal source are connected to a radio distribution network which may be defined as an arrangement of passive elements (power splitters, couplers, circulators, etc.) that are used to distribute signals to antennas positioned throughout the specific area, for example, the interior of a building.

The connection between the signal source and the antennas can be implemented through a distribution network that can include physical and/or wireless connections, and the signal distribution network may or may not use splitters or couplers to distribute the signals to each antenna. In this manner, the signals generated or amplified by the signal source are received and radiated by the antennas to provide radio frequency ("RF") coverage in all of the areas of the desired or specific area, enabling Downlink communication (from the signal source to the terminal units ("TUs")) of the signals from the source to all terminal units located in that specific area or space. The terminal units may include cell phones, tablets, IoT devices, walkie talkies, or other receiver or transceiver device that can communicate using one or more of the RF signals from the signal source.

FIG. 1 illustrates a known radio communication system including a signal source 101, a transmission line 109, an antenna port or connector 103, an antenna 105, and a terminal unit 107. In the Uplink direction (from the terminal units to the signal sources), the antennas, that are distributed throughout the specified or desired area or space, receive the signals that are emitted or transmitted by the terminal units, and through use of the same distribution network that allows communication in the Downlink direction, these signals transmitted by the TUs reach the signal source, which allows communication to be established between the TUs and the signal source in the Uplink direction.

A problem experienced by all of these systems relates to the inability of the signal sources and of the administrators of such radio communication systems to determine if any of the antennas (e.g., an antenna inside a building) has been disconnected or damaged, or if the functionality of the antenna has been altered in any manner. In general, signal sources may have the capability of determining whether the distribution network has been disconnected, but they are not fully aware and do not have the capability to control or monitor the operational status of the devices at the other end of the distribution network. For example, the signal sources cannot control or monitor the operation or performance of antennas distributed inside a building.

The use of signal boosters as signal sources in a public safety application serves to illustrate the problem with the prior art. FIG. 2 illustrates a known radio communication system with a point of anomaly. A signal booster (illustrated as a signal source 201) may be equipped with incident and reflected power meters, such that in the event that the coaxial connector coupled to the output port of the signal booster becomes disconnected, the power meter can detect reflected power, which would mean that due to a no load condition (e.g., open port) or mismatched impedance, the signal power is being reflected and returned to the signal booster through the transmission line 209. The detection of the reflected power would indicate that there is an operational malfunction within the distribution network (e.g., there is a fault or point of anomaly such as a short circuit 211), which allows the signal booster to generate an alarm, for example a VSWR alarm, to alert the system administrator that the distribution network is not operating properly and that there will be potential problems with the emission of radio signals all over the entire area of interest, and consequently, that TUs may be left without coverage by not establishing a proper link with the signal booster.

FIG. 3 illustrates a known radio communication system with a point of anomaly and experiencing loss of signal due to transmission line attenuation. FIG. 3 shows a signal booster being used as a signal source 301, a long transmission line 309, and a point of anomaly 311 (e.g., a short circuit). Now, detection of reflected signal power is directly linked to the attenuation experienced by the signal from the time it is reflected (reflection may be generated by a disconnection of the coaxial cable, by an impedance problem/mismatch in the transmission line, or by a short circuit) until the time the reflected signal is received by the power meter in the signal booster. When the reflection occurs at the output connector of the signal booster (for example, if someone disconnects the coaxial output connector of the signal booster), the reflection is measured without any attenuation and is easily detectable. On the other hand, if the reflection occurs along a certain stretch of the transmission line, for example by an impedance mismatch at some point inside a coaxial cable, then the reflected signal returns back from the coaxial cable to the signal booster. If the reflected signal, as it makes its way back to the signal booster, is attenuated as a result of the travel distance between the point of reflection and the signal booster (which is almost if not always the case, as all transmission lines introduce losses that translate into attenuation of the signals), then it can be very difficult for the signal booster to detect such reflected signal, which means that in effect the signal booster loses its ability to detect anomalies in the distribution network.

FIG. 4 illustrates a known radio communication system including a signal booster used as a signal source 401, a transmission line 409, a power splitter 413, an operational antenna 405, and a point of anomaly 411. The ability to detect points of anomaly is further impaired when the distribution network includes signal splitters or signal couplers, which are components used to split signals and feed them to two or more coaxial cables, because these signal splitting components (e.g., power splitters, couplers, taps, etc.) further attenuate the signals (both incident and reflected signals) and because due to their design or manufacture, they oftentimes absorb the signals after the signals are reflected and returned back to the splitting device output port. As a result of the use of these splitting components, the signal reflected from a point of anomaly is prevented from ever reaching the signal booster, preventing the signal booster from detecting anomalies beyond the splitting or signal coupling components.

Another problem with indoor distribution systems is the inability to determine the location of the TUs. When a TU transmits an uplink ("UL") signal, that signal is received by at least one of the indoor antennas, it travels through the distribution network to the signal source, as all the UL signals received by all the indoor antennas do, which makes the signal source unable to determine where a particular TU is located within the specific coverage area. By contrast, in a scenario where the intended coverage area is outdoors, many signal sources may receive the same UL signal from a specific TU and an analysis of power received from the TU can be performed in the time domain, which means that it would be possible to determine the location of a TU located outdoors through dimensional analysis.

There are different solutions to provide indoor location of the TUs, but those solutions require the installation of software or firmware on the TU so that the TU can send specific information to the signal source, which might then be used to provide a dimensional location of the TU. Other solutions to provide indoor location of the TUs require the installation of additional hardware in the TU and/or at the indoor location, such as but not limited to, RFID, beacons and others, which provides the signal source with the ability to provide a dimensional location of the TU based on information received from the additional hardware. All of the present solutions require additional software and/or firmware and/or hardware to be incorporated at or with the Terminal Unit, or hardware installed at the indoor area for the Terminal Unit to interact with the hardware.

A brief description of solutions that have been applied to the problem of detecting anomalies that may exist in the signal distribution systems follows. A first existing solution is the placement of VSWR alarms at the signal source output. This existing method is the most basic for detecting anomalies in the signal distribution network (distribution network, antennas, splitters, couplers, etc.) and it is limited by the attenuation experienced by the signals when reflected from the point of anomaly (broken coaxial cable, unplugged connector, antenna disconnected or damaged, short circuit, among others) until they reach the output port of the signal source. See FIG. 3.

A second existing solution implements granularity of the signal sources. With the goal of being able of exerting better control over each indoor antenna (and monitoring each antenna), and with the objective of obviating the losses that are introduced by the distribution networks, among other improvements, another existing solution involves providing signal sources with a higher level of granularity, meaning that each signal source manages a very small number of antennas which are connected to the signal source through very short paths of distribution media (e.g., short jumpers of coaxial cable), allowing any reflected signal to be detected by the signal source. The problem with this alternative existing solution is that it requires installation of a large number of signal sources, which causes a negative impact on the overall cost of the system, making this solution unviable for many systems. This solution is illustrated in FIG. 5, which shows a side by side comparison of a more conventional radio distribution network having a signal source 501, several power splitters 513 and indoor antennas 505, with a granular system having each signal source from the set of signal sources 521 connected to a corresponding antenna in the set of antennas 525 through short paths.

A third existing solution involves positioning couplers and/or other devices or components within the passive distribution network to monitor the VSWR reflected from the antennas. In this case many units are placed within the distribution network to constantly measure the VSWR of the cables and antennas. One limitation of this solution is that measuring the VSWR only provides an indication of how the network impedance is compensated, but does not reveal any information related to modifications or changes to the distribution network that result in changes to the signal propagation indoors. For example, if a third party replaces a original coaxial cable or transmission line in the distribution network for another transmission line with the same characteristic impedance but with different attenuation specifications, then the VSWR may not change and may not be indicative of any problems within the distribution network, the new additional losses introduced in the distribution network (due to the new transmission line attenuation specifications) may cause the signals to be further attenuated, affecting the resulting propagation of signals at the indoor location, which would also constitute a failure of the system.

A fourth existing solution involves connecting or embedding devices with antennas which detect through use of RFID, current sensing, current consumption, among others, if the antennas are connected to the passive distribution network. This type of solution allows the system owner or administrator to verify that all antennas are connected, but the disadvantage of these systems is that they do not provide an indication of VSWR or changes in the network and/or faults that modify the indoor propagation pattern.

With respect to a determining the location of a terminal unit positioned indoors, some solutions are based on specific software and/or firmware and/or hardware installed on the TU and/or the indoor location, wherein such software/firmware/hardware reads TU information such as, but not limited to, GPS location, and determines whether such information is transmitted to the signal source for dimensional location calculations. The limitation of these solutions is that their effectiveness depends on such software and/or firmware and/or hardware installed on the TU and/or at the indoor location, which increases the cost of the overall system and makes the system less fault tolerant, as the system performance will be dependent on additional system variables, reducing the system reliability. Further, in some cases these type of systems are limited in terms of performance due to the limited availability of external information, such as but not limited to, GPS signals present in the indoor location of the TU.

Therefore, in view of these disadvantages, there is a need in the art for an improved system and method to detect and report the location of points of anomaly of a radio distribution network of a radio communication system and to detect the location of terminal units within an indoor coverage area.

SUMMARY

The following presents a simplified summary of the invention in order to provide a basic understanding of some aspects of the invention. This summary is not an extensive overview of the invention. Rather than specifically identifying key or critical elements of the invention or to delineate the scope of the invention, its purpose, inter alia, is to present some concepts of the invention in a simplified form as a prelude to the more detailed description that is presented later.

The present disclosure relates to the detection of points of anomaly in a radio communications system and to the determination of the location of terminal units within an indoor signal coverage area. In exemplary implementation of the present disclosure, a communication system may include a signal source for transmitting downlink signals and receiving uplink signals to and from an indoor signal coverage area; a distributed antenna system interposed between the signal source and the indoor signal coverage area, the distributed antenna system having a master unit connected to at least one remote unit through a distribution network; and at least one antenna, connected to and corresponding to the at least one remote unit, for transmitting and receiving the downlink signals and the uplink signals to and from terminal units within the indoor coverage area. The master unit and the remote unit may be configured to detect the location of points of anomaly within the communication system. Further, the master unit may be configured to detect the location of terminal units within the indoor coverage area based on information provided by the at least one remote unit.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description of the invention when considered in conjunction with the drawings.

BRIEF DESCRIPTION OF THE DRAWINGS

The drawings, in which like numerals represent similar parts, illustrate generally, by way of example, but not by way of limitation, various embodiments discussed in the present document.

DETAILED DESCRIPTION

The foregoing summary, as well as the following detailed description of certain embodiments of the subject matter set forth herein, will be better understood when read in conjunction with the appended drawings. In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that variations may be made without departing from the scope of the subject matter disclosed herein. It should also be understood that the drawings are not necessarily to scale and in certain instances details may have been omitted, which are not necessary for an understanding of the disclosure, such as details of fabrication and assembly. Furthermore, references to "one embodiment" are not intended to be interpreted as excluding the existence of additional embodiments that also incorporate the recited features. The following detailed description is, therefore, not to be taken in a limiting sense, and the scope of the subject matter disclosed herein is defined by the appended claims and their equivalents.

The present disclosure describes a system that solves the problems with the prior art. The exemplary implementations disclosed herein include incorporating into the signal distribution network components of a DAS. In a DAS a base transceiver station (a type of signal source) connects with a principal or master unit ("MU"), which in turn connects to one or more secondary or remote units ("RU") through a digital fiber transmission line, for example. Each RU may be in turn connected to one or more indoor antennas, which may be referred to as nodes in the DAS. These indoor antennas provide local coverage to TUs within a broader coverage area.

The exemplary implementations disclosed herein include incorporating into the signal distribution network a system that includes an MU coupled or connected to the output port of the signal source and one or more RUs coupled or connected to the input connectors of the indoor antennas.

Figure 6:
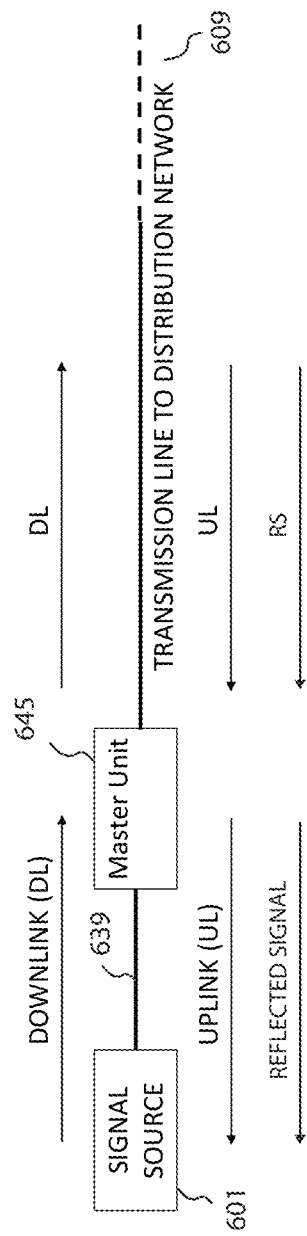
FIG. 6 illustrates a radio communication system with a Master Unit connected in between a signal source and a signal distribution network in accordance with one exemplary implementation of the disclosure.

FIG. 6 illustrates a radio communication system with a Master Unit 645 connected in between a signal source 601 and a signal distribution network in accordance with one exemplary implementation of the disclosure. The Master Unit 645 may be connected to the output port of the signal source 601 through a short path 639, which may be implemented as a wired connection such as coaxial cable or fiber, or as a wireless connection when the antenna of the signal source 601 transmits signals received by the antenna of the Master Unit 645 and vice versa. The Master Unit 645 may be connected to the distribution network through transmission line 609.

Figure 1:
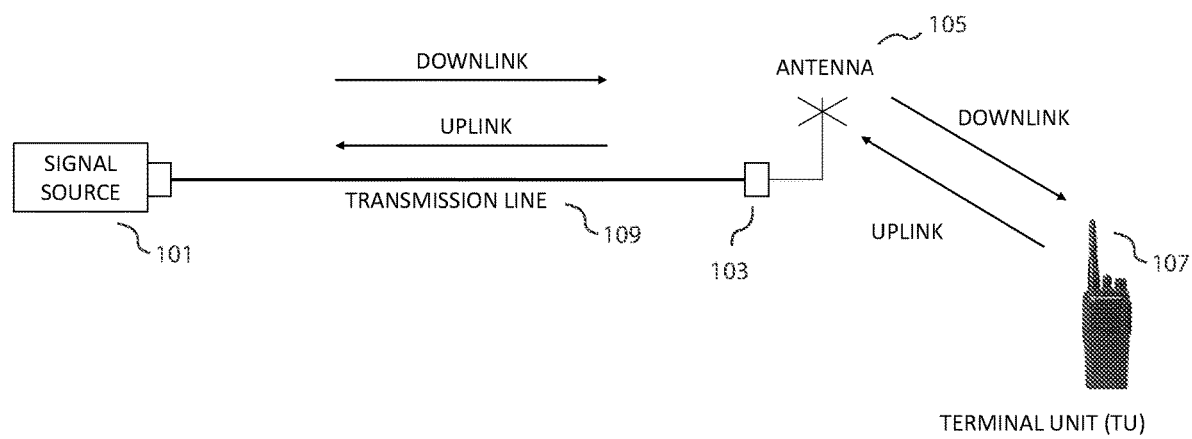
FIG. 1 illustrates a known radio communication system including a signal source, a transmission line, an antenna, and a terminal unit.
Figure 2:
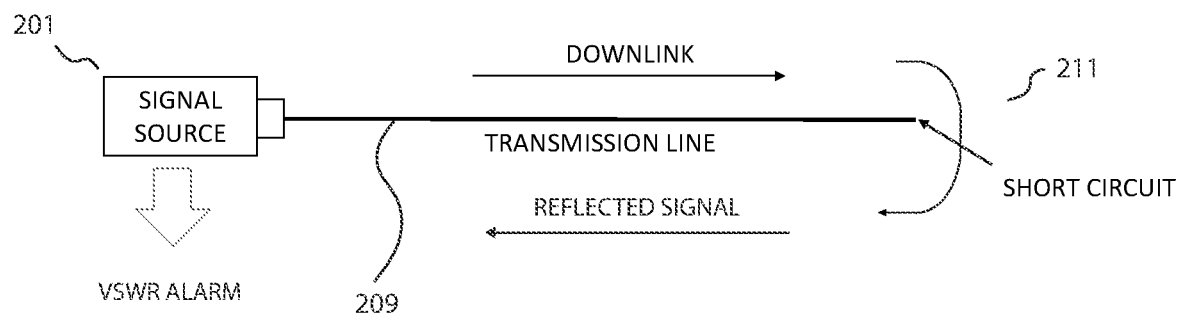
FIG. 2 illustrates a known radio communication system with a point of anomaly.
Figure 3:
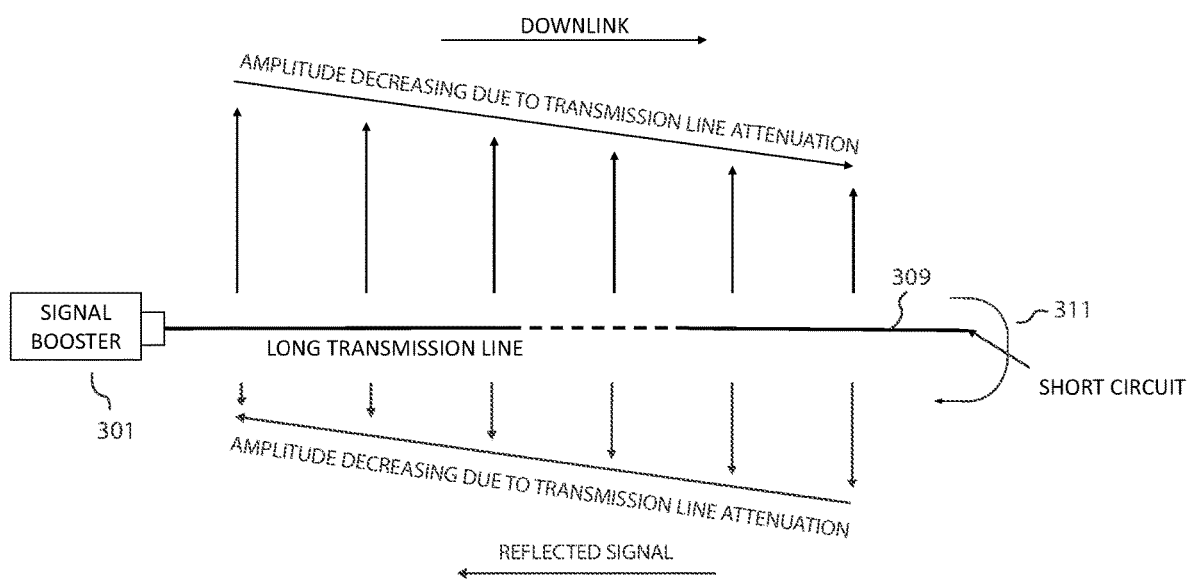
FIG. 3 illustrates a known radio communication system with a point of anomaly and experiencing loss of signal due to transmission line attenuation.
Figure 4:
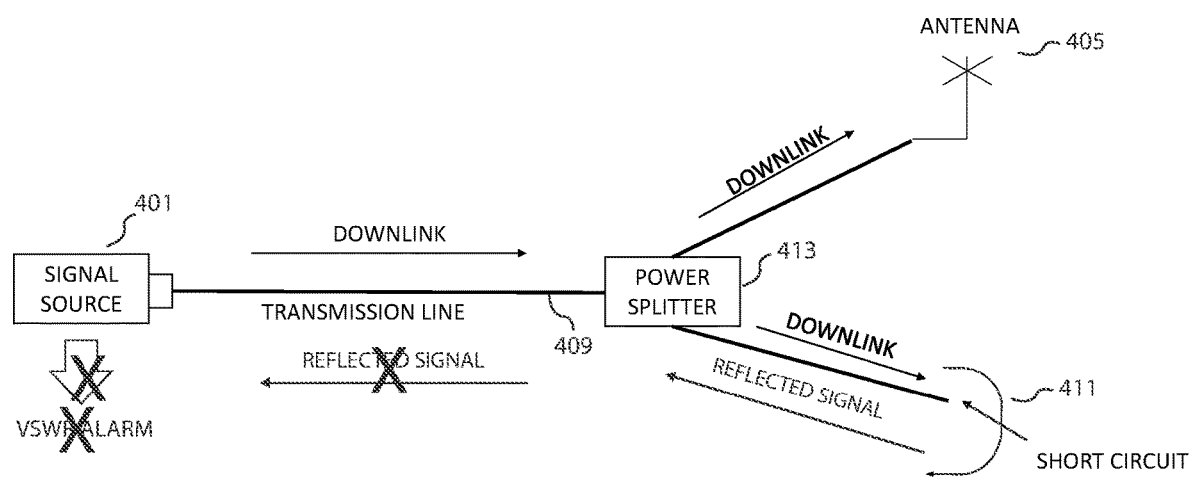
FIG. 4 illustrates a known radio communication system including a signal source, a transmission line, a power splitter, an operational antenna, and a point of anomaly.
Figure 5:
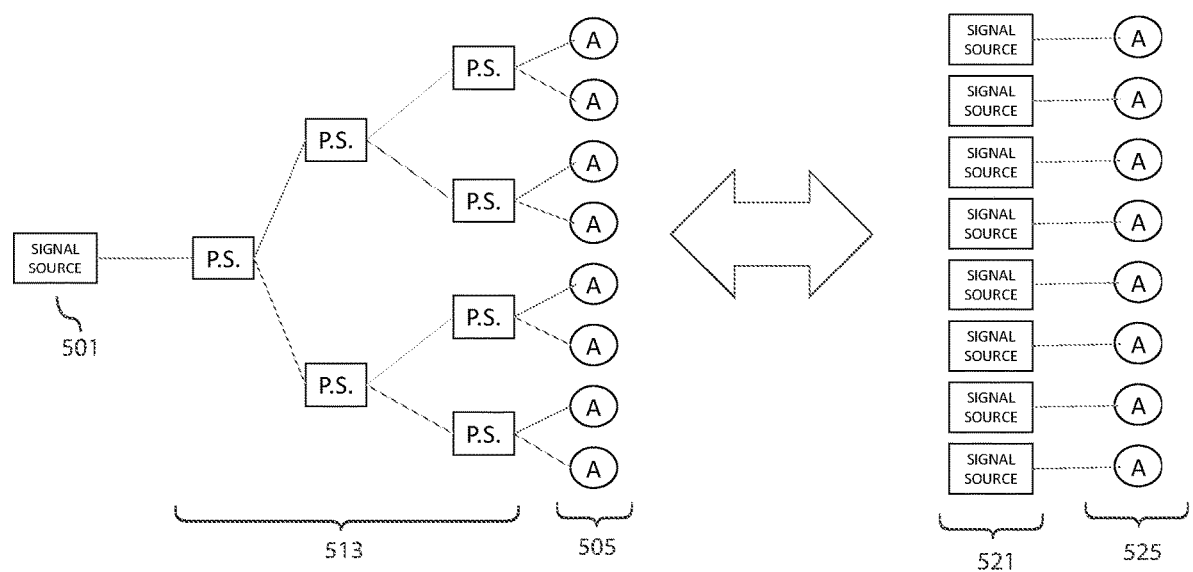
FIG. 5 illustrates a known radio communication system short paths of signal distribution.

The Master Unit 645, by being connected between the signal source 601 and the signal distribution network, provides the ability of allowing the signal from the signal source 645 to experience minimal attenuation as the signal passes through the MU 645 in the Downlink direction. The signals in the Uplink direction and also in the reflected direction (an Uplink direction based on the Downlink signal being reflected due to mismatches or other reasons) also experience minimal attenuation as they pass through the Master Unit 645. One exemplary passive distribution network is illustrated by elements 513 and 505 in FIG. 5. Alternatively, the passive distribution network may include other passive elements such as couplers or circulators instead of, or in combination with power splitters. Since in one embodiment both the MU and RU may include amplifiers that amplify the signals in both downlink and uplink directions, they are not considered passive elements but in other embodiments they may be considered part of a distribution network.

Figure 7:
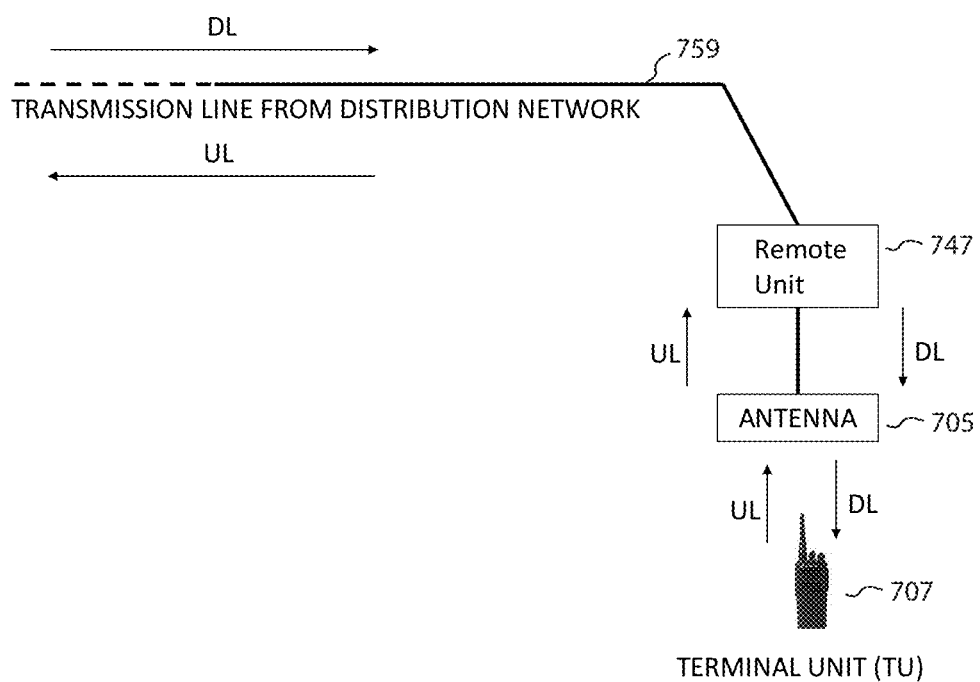
FIG. 7 illustrates a radio communication system with a Remote Unit connected at the end point of a radio distribution network in accordance with one exemplary implementation of the disclosure.

FIG. 7 illustrates a radio communication system with a Remote Unit 747 connected at the end point of a radio distribution network through a transmission line 759 in accordance with one exemplary implementation of the disclosure. The Remote Units, by being connected at the end points of the signal distribution network, provide the ability of allowing signals in the Downlink and Uplink direction (from Terminal Unit 707) to experience minimal attenuation (as they pass through the RUs), including signals in the reflected direction (an Uplink direction based on the Downlink signal being reflected due to mismatches with an antenna 707 or for other reasons).

In FIGS. 6 and 7, the transmission lines 609 and 759 may be implemented as digital fiber, coaxial cable, twisted cable, multipar cable such as ethernet CAT5, CAT6 or similar, or can be also a wireless connection between the MU and RU. It should be understood that the MU and RU will have the proper physical interfaces to communicate with each other through the transmission line.

Figure 8:
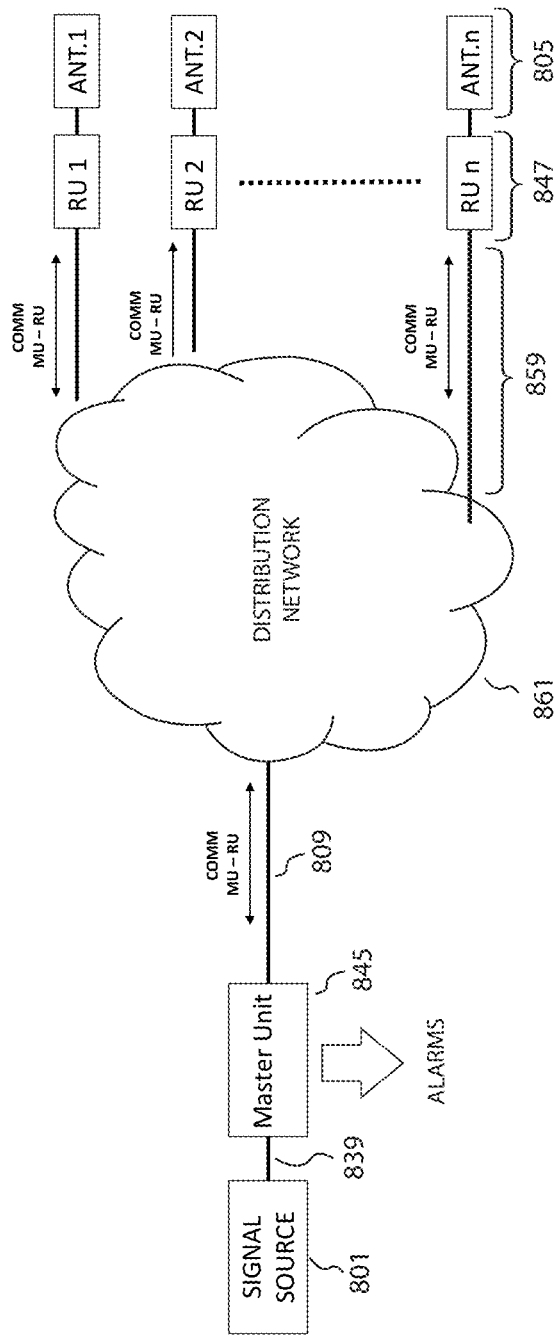
FIG. 8 illustrates a radio communication system with a Master Unit establishing communication with Remote Units in accordance with one exemplary implementation of the disclosure.

FIG. 8 illustrates a radio communication system with a Master Unit 845 establishing communication with Remote Units 847 in accordance with one exemplary implementation of the disclosure. The system of FIG. 8 may include a signal source 801 connected to the Master Unit 845 through a short path 839 such as a wired connection (coaxial, fiber, twisted pair) or a wireless connection through the use of antennas. The Master Unit 845 communicates with the Remote Units 847 through the distribution network 861 and transmission lines 809 and 859. The Remote Units 847 may directly connect with indoor antennas 805, for example through use of a coaxial cable, which provide signal coverage to Terminal Units (not illustrated in FIG. 8). By being positioned at the endpoint of the distribution network 861, the Remote Units 847 can detect points of anomaly (e.g., faulty antennas), and transmit to the Master Unit 845 information regarding the location of the point of anomaly. Also, the Master Unit 845 establishes communication with the Remote Units 847 in order to be able to exchange information on the operation of the Remote Units 847. Based on the information exchanged with the Remote Units 847, the Master Unit 845 can generate alarms or reports that identify the location of points of anomaly within the radio communication system.

In one implementation, points of anomaly within the distribution network may be detected by the Master Unit 845 in several ways. For example, the Master Unit 845 may measure the power reflected from the distribution network 861 which is transmitted through line 809 and based on the reflected power measurement the Master Unit 845 may generate a VSWR alarm and may determine whether there are any points of anomaly located close to it.

The Master Unit 845 identifies the Remote Units 847 it establishes communication with and through a polling process the Master Unit 845 may request information indicating the downlink power level received by each Remote Unit 847. If a Remote Unit 847 does not respond to the request from the Mater Unit 845, then the Master Unit 845 will identify the non-responsive Remote Units and flag them as a point of anomaly (for example, when the Remote Unit has been removed) and can also flag the components of the distribution network interposed between the Master Unit 845 and the non-responsive Remote Unit (i.e., the signal path between the MU and the non-responsive RU) as having points of anomaly.

In the event that a Remote Unit 847 is responsive to the polling process and that Remote Unit is not reporting any alarms identifying any indoor antenna 805 as malfunctioning, the Remote Unit can still report to the Master Unit 845 the power level of the signal received in the downlink direction (from the MU). Once the Master Unit 845 receives the downlink signal level from the Remote Unit, the Master Unit 845 can compare its own output signal level in the downlink direction with the received Remote Unit downlink signal level and calculate the losses along the signal path along the transmission lines 809 and 859 and the distribution network 861. The Master Unit 845 may store the calculated loss in a log of each loss level between the Master Unit 845 and each Remote Unit 847. If the calculated loss value changes over time for a particular Remote Unit, the Master Unit 845 may flag the components of the distribution network interposed between the Master Unit 845 and the Remote Unit reporting changes in the received downlink level over time (i.e., the signal path between the MU and the non-responsive RU) as having points of anomaly.

Figure 9:
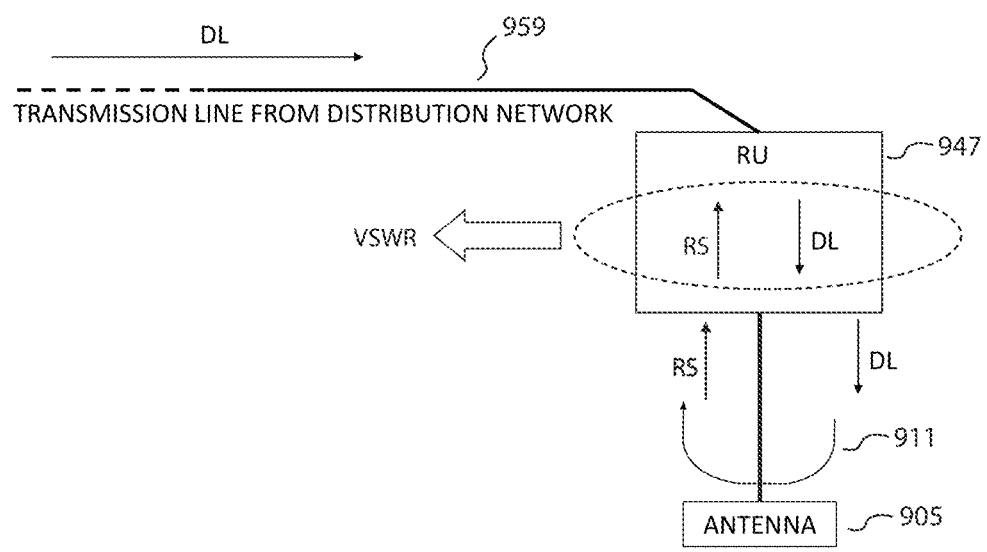
FIG. 9 illustrates a radio communication system with a Remote Unit detecting a malfunction in accordance with one exemplary implementation of the disclosure.

FIG. 9 illustrates a radio communication system with a Remote Unit 947 detecting a malfunction 911 in accordance with one exemplary implementation of the disclosure. The system of FIG. 9 may include a Remote Unit 947 connected to the end point of a distribution network through a transmission line 959 and configured to be connected to an antenna 905. Remote Units 847 of FIG. 8 may be implemented as the Remote Unit 947. The Remote Unit 947 is able to measure the Downlink signal power, measure the reflected signal power, and to detect if there is any reflection from its associated antenna 905. Because the Remote Unit 947 is coupled or connected to the antenna 905, any reflection generated from the antenna 905 is a sign of antenna malfunction or that the antenna has been removed. The location of the point of anomaly, for example an antenna malfunction (e.g., short circuit 911) or antenna removal, can be ascertained by a Master Unit based on the location of the Remote Unit associated with the antenna. The location information corresponding to the point of anomaly is forwarded by the Remote Unit to the Master Unit, together with an alarm signal indicating that there is an anomaly (for example a VSWR measurement).

In one exemplary implementation of the disclosure, the Remote Units, by being in constant communication with the Master Unit, report if they have detected signal power reflected from their associated antennas, allowing the Master Unit to report with a higher level of specificity regarding any antenna anomalies. The higher level of specificity refers to the Master Unit's ability to send alarms or detailed reports to the network manager or administrator or the person in charge of overseeing the system. The reporting or alarm generation may be implemented by sending a signal that will trigger a LED panel at the network manager's location to warn of any antenna anomalies, or it may also be implemented by sending SNMP traps to an NMS/server over the Internet.

The Master Unit, through the communications maintained with the Remote Units, is able to ascertain or determine the signal level that reaches each Remote Unit from the distribution network, and by comparing these signal levels with information previously uploaded by the administrator into the system, the Master Unit can determine if there has been a variation in the losses of the signal distribution network and can report such anomaly (increased or decreased losses) which affects the operation of the system, allowing the Master Unit to report with a higher level of specificity.

The Master Unit, through the communications maintained with the Remote Units, and in the event that a Remote Unit fails to provide a report or is not reporting to the Master Unit, can interpret the failure of the Remote Unit to report as a major malfunctioning or fault in the signal distribution network that is seriously affecting the operation of the system, allowing the Master Unit to report this event with a higher level of specificity.

Figure 10:
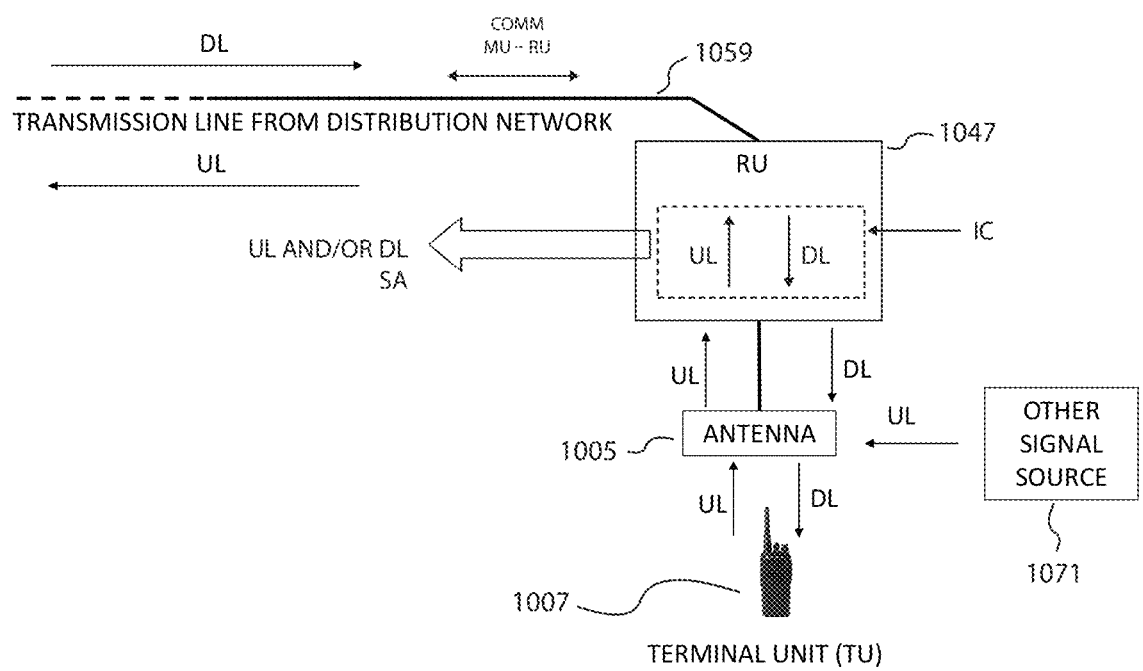
FIG. 10 illustrates a radio communication system with a Remote Unit with an integrated circuit to conduct spectrum analysis in accordance with one exemplary implementation of the disclosure.

FIG. 10 illustrates a radio communication system with a Remote Unit 1047 having an integrated circuit configured to conduct spectrum analysis in accordance with one exemplary implementation of the disclosure. The system of FIG. 10 may include a Remote Unit 1047 connected to the end point of a distribution network through a transmission line 1059 and configured to be connected to an antenna 1005 that provides signal coverage to Terminal Unit 1007.

The Remote Unit 1047 may include integrated circuitry (IC) to perform spectrum analysis (SA) in the downlink (DL) and/or uplink (UL) direction, measuring spectrum parameters such as, but not limited to, broadband power levels, specific bandwidth power levels, noise levels in broadband and specific power levels, among others, in order to provide the Master Unit with specific spectrum information as requested by the Master Unit and/or End Users through the MU-RU communication path, where UL signals can originate from any Terminal Unit or any other signal source 1071 that can be received by the antenna 1005. Since the entire radio communication system may be synchronized, in one implementation all Remote Units may listen to and measure the TU uplink signal levels and then report these levels (time stamped) and/or spectrum parameters (time stamped) to the Master Unit. Upon receipt of the time stamped signal levels and the spectrum parameters corresponding to each Terminal Unit (or additional signal sources), the Master Unit will then have sufficient data about signal strengths and delays received at each antenna 1005 and may use that data to triangulate the location of each Terminal Unit within the indoor area of coverage as it also knows the physical location of each Remote Unit in the indoor location.

Figure 11:
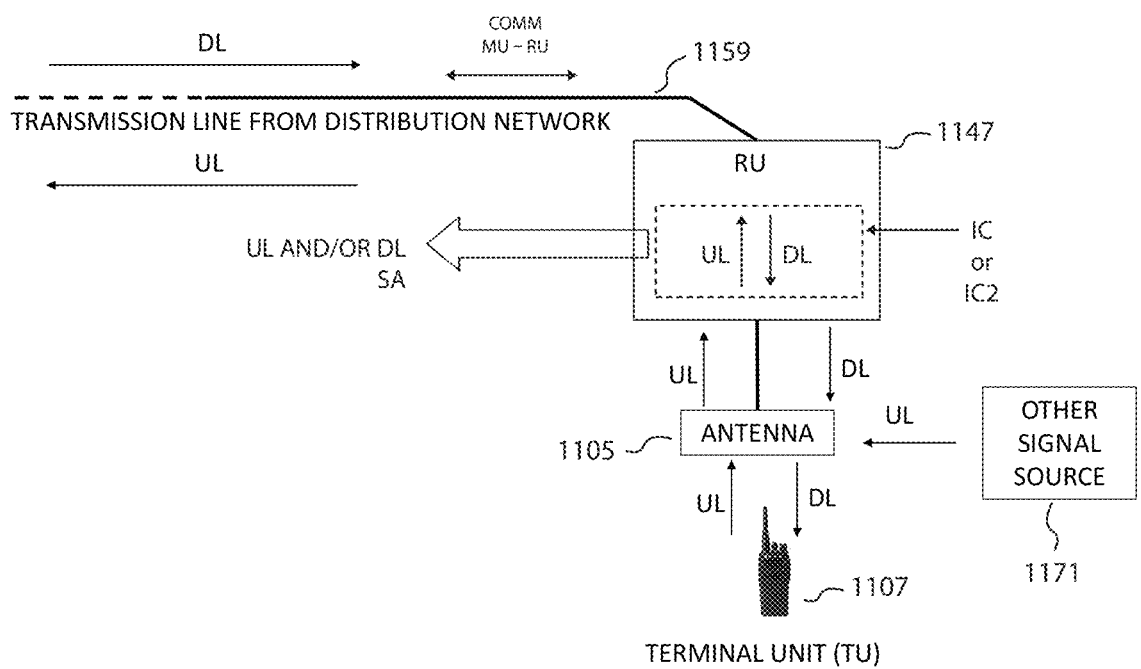
FIG. 11 illustrates a radio communication system with a Remote Unit with an integrated circuit to conduct signal demodulation in accordance with one exemplary implementation of the disclosure.

FIG. 11 illustrates a radio communication system with a Remote Unit 1147 having an integrated circuit configured to conduct signal demodulation in accordance with one exemplary implementation of the disclosure. The system of FIG. 11 may include a Remote Unit 1147 connected to the end point of a distribution network through a transmission line 1159 and configured to be connected to an antenna 1105 that provides signal coverage to Terminal Unit 1107.

The Remote Unit 1147 may include integrated circuitry that can be the same integrated circuitry used for the SA (IC) in FIG. 10 or other integrated circuitry or dedicated circuitry (IC2) specifically designed or configured to perform signal demodulation (SD) in the DL and/or UL direction, from one or more channels, in order to get signal information such as, but not limited to, time slots synchronism and user data information, in order to provide the Master Unit with specific information as requested by the Master Unit and/or End Users through the MU-RU communication path, where UL signals can originate from any Terminal Unit or any other signal source 1171 that can be received by the Antenna. In this exemplary implementation, the Master Unit receives information from the Remote Units related to the demodulated signals and may determine the location of Terminal Units by making a comparison of delays based on demodulated baseband signals, for example, by comparing the delay of each symbol received at each Remote Unit.

Figure 12:
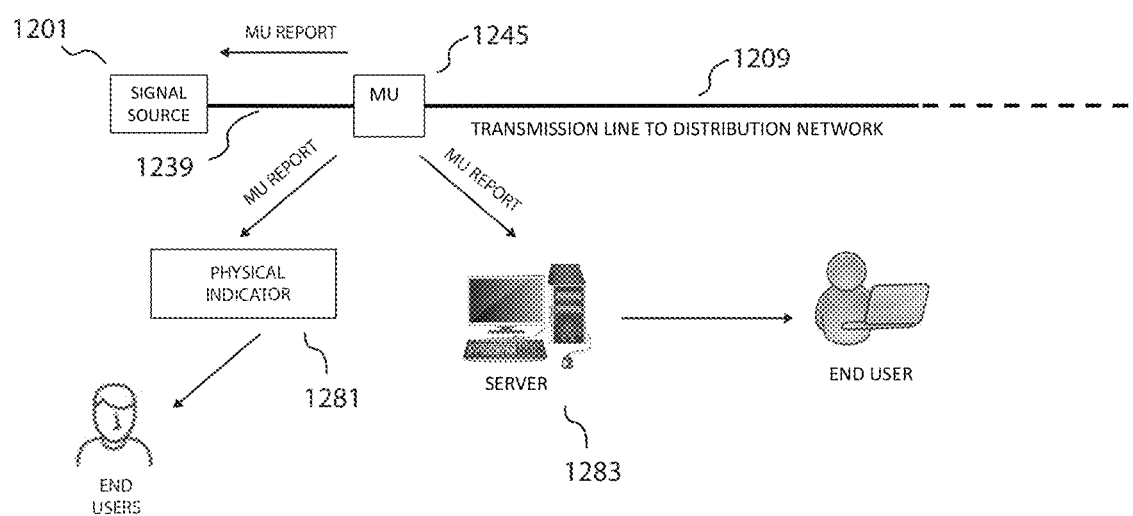
FIG. 12 illustrates a radio communication system with a Master Unit separate from a signal source with capability to report on measurements gathered by Remote Units in accordance with one exemplary implementation of the disclosure.
Figure 13:
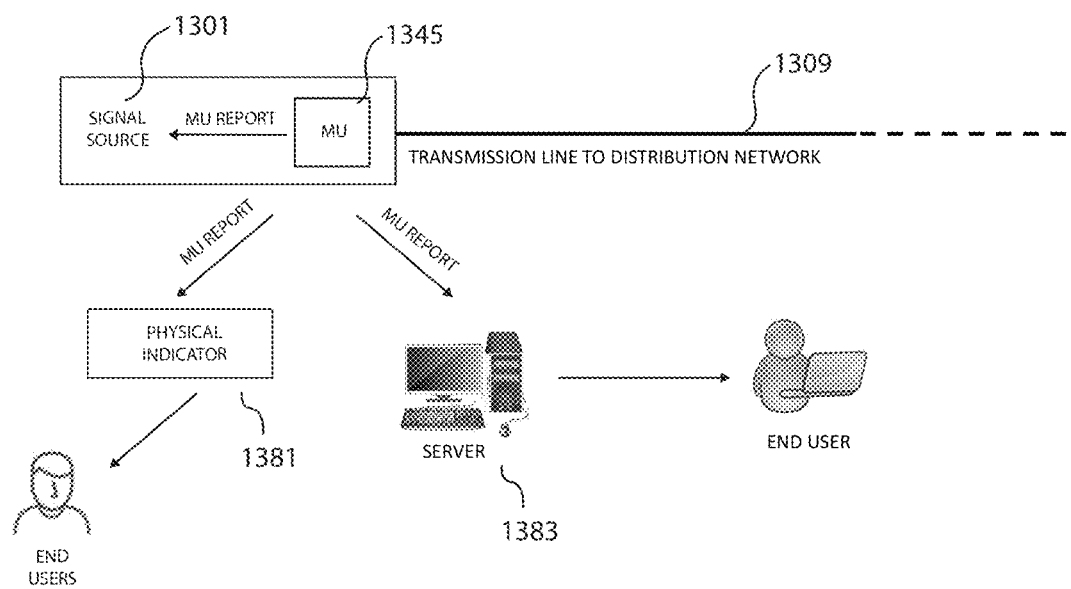
FIG. 13 illustrates a radio communication system with a Master Unit integrated with a signal source with capability to report on measurements gathered by Remote Units in accordance with one exemplary implementation of the disclosure.

FIG. 12 illustrates a radio communication system with a Master Unit 1245 separate from a signal source 1201 with capability to report on measurements gathered by Remote Units in accordance with one exemplary implementation of the disclosure. FIG. 13 illustrates a radio communication system with a Master Unit 1345 integrated with a signal source 1301 with capability to report on measurements gathered by Remote Units in accordance with one exemplary implementation of the disclosure.

The Master Unit can be integrated into the signal sources (FIG. 13) or it can be implemented as a unit separate from the signal source (FIG. 12), with the capability to report on any or all the measurements gathered by one Remote Unit or any Remote Unit to the signal source (meaning that the MU can report to the signal source in case the signal source needs to receive the MU information) and/or to an external server (1283 or 1383) and/or to a system administrator and/or an end user via physical indicators (1281 or 1381) such as, but not limited to, dry contacts and/or LEDs, and/or via a computer-based software and/or any other communication method and/or technique.

The foregoing description of possible implementations consistent with the present disclosure does not represent a list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims. Further, the limitations of the following claims are not written in means—plus-function format and are not intended to be interpreted based on 35 U.S.C. 112(f), unless and until such claim limitations expressly use the phrase "means for" followed by a statement of function void of further structure.

The invention claimed is:

1. A communication system comprising:
   a signal source for transmitting downlink signals to an indoor signal coverage area and for receiving uplink signals from said indoor signal coverage area;
   a distributed antenna system interposed between the signal source and the indoor signal coverage area, said distributed antenna system comprising a master unit connected to at least one remote unit through a distribution network; and
   at least one antenna, connected to said at least one remote unit, for transmitting the downlink signals to and receiving the uplink signals from at least one terminal unit within the indoor coverage area;
   wherein the master unit and the remote unit are configured to detect a location of points of anomaly within the communication system;
   wherein the master unit is further configured to detect a location of said at least one terminal unit within the indoor coverage area based on information provided by the at least one remote unit; and
   wherein the master unit is configured to detect the location of points of anomaly within the communication system by sending a first request to the at least one remote unit for information corresponding to the downlink signal power level received by the at least one remote unit.

2. The system of claim 1, wherein the at least one remote unit is configured to detect the location of points of anomaly within the communication system by (i) measuring signal power reflected from its corresponding antenna or antennas to determine whether that antenna is malfunctioning, and (ii) in the event that the antenna is malfunctioning, transmitting to the master unit location information for the malfunctioning antenna.

3. The system of claim 2, wherein the remote unit measures the signal power reflected from its corresponding antenna or antennas through a Voltage Standing Wave Ratio meter.

4. The system of claim 1, wherein the master unit is configured to detect the location of points of anomaly within the communication system by measuring signal power reflected from the distribution network to determine whether there are any points of anomaly within the distribution network.

5. The system of claim 4, wherein the master unit measures the signal power reflected from the distribution network through a Voltage Standing Wave Ratio meter.

6. The system of claim 1, wherein the master unit flags the remote unit that was the intended recipient of the first request for information as a point of anomaly in the event that that no downlink signal power level information is received by the master unit.

7. The system of claim 1, wherein the master unit flags components of the distribution network interposed between the master unit and the remote unit that was the intended recipient of the first request for information as a point of anomaly in the event that that no downlink signal power level information is received by the master unit.

8. The system of claim 1, wherein the master unit receives downlink signal power level information from the at least one remote unit in response to said first request, compares the master unit output signal level in the downlink direction with the downlink signal level information received from the at least one remote unit in response to said first request, and calculates a first loss measurement along the signal path between the master unit and the at least one remote unit.

9. The system of claim 8, wherein the master unit flags the components of the distribution network interposed between the master unit and the remote unit that received the first request for information when the first loss measurement exceeds a predetermined threshold.

10. The system of claim 1, wherein the master unit is configured to detect the location of points of anomaly within the communication system by sending a second request to the at least one remote unit for information corresponding to the downlink signal power level received by the at least one remote unit, wherein the master unit receives downlink signal power level information from the at least one remote unit in response to said second request, compares the master unit output signal level in the downlink direction with the downlink signal level information received from the at least one remote unit in response to said second request, calculates a second loss measurement along the signal path between the master unit and the at least one remote unit, and creates a log to store said first loss measurement and said second loss measurement.

11. The system of claim 10, wherein the master unit compares said first loss measurement and said second loss measurement, and in the event that said first loss measurement varies from said second loss measurement, the master unit flags the components of the distribution network interposed between the master unit and at least one remote unit reporting changes in the received downlink level over time.

12. The system of claim 1, wherein the at least one remote unit includes an integrated circuit that calculates spectral parameters corresponding to the at least one terminal unit or to downlink signals; wherein the at least one remote unit periodically transmits the spectral parameters to the master unit in the uplink direction through the distribution network; and wherein the master unit is configured to detect the location of said at least one terminal unit within the indoor coverage area based on the spectral parameters.

13. The system of claim 12, wherein the spectral parameters are timestamped and the master unit triangulates the location of said at least one terminal unit within the indoor coverage area based on the spectral parameters and delay information derived from time stamped parameters received by the master unit over time.

14. The system of claim 1, wherein the remote unit includes an integrated circuit that demodulates signals received from the at least one terminal unit or to downlink signals; wherein the at least one remote unit periodically transmits baseband information corresponding to the demodulated signals to the master unit in the uplink direction through the distribution network; and wherein the master unit is configured to detect the location of said at least one terminal unit within the indoor coverage area by determining from the baseband information delays of symbols received by said at least one remote unit and comparing delays of each said symbols.

15. The system of claim 1, wherein the master unit generates alarms or reports to warn of points of anomaly in the communication system, and transmits said alarms or reports to trigger a Light Emitting Diode panel at a network administrator location or to close a relay or dry contact.

16. The system of claim 1, wherein the master unit generates alarms or reports to warn of points of anomaly in the communication system, and transmits said alarms or reports as Simple Network Management Protocol traps to a remote server through a computer network.

17. The system of claim 1, wherein said signal source comprises one of a base transceiver station, a small cell, a signal booster, a repeater, a bidirectional amplifier, or a fiber distributed antenna system.

18. The system of claim 1, wherein the distribution network comprises at least one of a power splitter, a coupler, or a circulator.

19. The system of claim 1, where the at least terminal unit comprises at least one of a cell phone, a tablet, an Internet of Things device, or a walkie talkie.

\* \* \* \* \*